US010207596B2

(12) United States Patent
Lin et al.

(10) Patent No.: US 10,207,596 B2
(45) Date of Patent: Feb. 19, 2019

(54) ADAPTIVE IDENTIFICATION OF THE WIRING RESISTANCE IN A TRACTION BATTERY

(71) Applicant: Ford Global Technologies, LLC, Dearborn, MI (US)

(72) Inventors: Xinfan Lin, Ypsilanti, MI (US); Yonghua Li, Ann Arbor, MI (US); Richard Dyche Anderson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 530 days.

(21) Appl. No.: 14/920,087

(22) Filed: Oct. 22, 2015

(65) Prior Publication Data

US 2017/0113565 A1   Apr. 27, 2017

(51) Int. Cl.
*B60L 11/18* (2006.01)
*B60L 3/00* (2006.01)

(52) U.S. Cl.
CPC ......... *B60L 11/1864* (2013.01); *B60L 3/0046* (2013.01); *B60L 11/187* (2013.01); *B60L 11/1857* (2013.01); *B60L 11/1861* (2013.01); *B60L 2240/545* (2013.01); *B60L 2240/547* (2013.01); *B60L 2240/549* (2013.01); *B60L 2260/44* (2013.01)

(58) Field of Classification Search
CPC .... B60L 11/1861–11/187; H02J 7/0008; H02J 7/0091; H02J 2007/005
USPC ......... 324/425–434, 503, 522, 525; 320/132, 320/152, 157–159, 162–164; 702/57–59, 702/63–65; 700/293; 180/65.29
See application file for complete search history.

(56) References Cited

U.S. PATENT DOCUMENTS

| | | | |
|---|---|---|---|
| 2008/0091362 A1* | 4/2008 | Tae ..................... | G01R 31/3658 702/63 |
| 2009/0058366 A1* | 3/2009 | Masuda ................. | B60K 6/365 320/135 |
| 2010/0185405 A1* | 7/2010 | Aoshima ............... | B60L 3/0046 702/63 |
| 2012/0004875 A1 | 1/2012 | Maeda et al. | |
| 2012/0046892 A1* | 2/2012 | Fink .................... | G01R 31/3658 702/63 |
| 2013/0200902 A1* | 8/2013 | Kurimoto .......... | G01R 31/3662 324/430 |

(Continued)

*Primary Examiner* — Patrick Assouad
*Assistant Examiner* — Demetrius R Pretlow
(74) *Attorney, Agent, or Firm* — David B. Kelley; Brooks Kushman P.C.

(57) ABSTRACT

A vehicle includes a traction battery and a controller coupled to the traction battery and having a memory, the controller being programmed to control the traction battery based on a difference between a total resistance indicated by voltage and current at a first operating condition and a battery cell resistance associated with the first operating condition previously stored in the memory, the difference being indicative of a wiring resistance associated with electrical connectors such as wires, cables, bus bars, and the like of the battery. The battery or the vehicle may be controlled in response to the adaptively determined wiring resistance by adjusting subsequent voltage or current determinations used to determine state of charge and battery capacity and/or to control charging or discharging of the battery and selection of various vehicle operating modes.

20 Claims, 5 Drawing Sheets

(56) References Cited

U.S. PATENT DOCUMENTS

2014/0214268 A1 7/2014 Li et al.
2014/0227571 A1* 8/2014 Paganelli ............ G01R 31/3658
 429/90
2015/0066405 A1 3/2015 Li et al.

* cited by examiner

ADAPTIVE IDENTIFICATION OF THE WIRING RESISTANCE IN A TRACTION BATTERY

TECHNICAL FIELD

The present disclosure relates to control of electrified vehicles based on internal resistance associated with connector or wiring resistance in vehicle traction batteries.

BACKGROUND

Electrified vehicles (EVs) including battery electric vehicles (BEVs), hybrid electric vehicles (HEVs) and plug-in hybrid electric vehicles (PHEVs) use electrical energy stored in a traction battery or battery pack to power an electric motor to move the vehicle. A battery pack in an electric vehicle usually consists of numerous individual cells connected in various types of arrangements. Electrically conductive connectors, such as wires, cables and bars, are commonly used to connect the cells for power output. These electrical connectors introduce ohmic resistance to the overall battery pack impedance or resistance. The ohmic resistance associated with the connectors may affect the accuracy of the battery cell and battery pack voltage measurements, which may be used to calculate various battery characteristics and to control battery and vehicle operation. In addition, the ohmic resistance may vary as the battery ages, and may vary from one battery to the next based on manufacturing and assembly tolerances.

SUMMARY

Methods and systems for controlling a battery in an electrified vehicle include controlling the battery in response to resistance associated with battery electrical connections, which may be referred to as an internal resistance or wiring resistance. The electrical connections include various electrically conductive structures, such as wires, cables, and bars, and may include other internal and external connectors. In an example, a method may include controlling the vehicle or battery in response to resistance associated with battery electrical connections based on battery voltage and current measured during battery operation at a first operating condition, such as a first battery temperature and/or first state of charge (SOC) compared to a previously stored resistance for the first operating condition. The battery voltage and current may correspond to individual battery cells, groups of cells, or the entire battery pack. Controlling the vehicle or battery may include adjusting subsequently measured cell and/or battery pack voltages based on the resistance associated with the battery electrical connections, and using the adjusted measured voltages to control battery charging or discharging, or in determining battery parameters such as SOC or battery capacity, for example.

In one embodiment, a vehicle includes a traction battery and a controller coupled to the traction battery and having a memory. The controller is programmed to control the traction battery based on a difference between a total resistance indicated by voltage and current at a first temperature, and a battery cell resistance associated with the first temperature that was previously stored in the memory, the difference being indicative of a battery electrical connection resistance or wiring resistance. The battery cell resistance may correspond to a single cell resistance multiplied by a number of cells in the traction battery with the single cell resistance based on measured cell current and voltage for a plurality of temperatures across a temperature operating range. The controller may be programmed to obtain the voltage and current for an individual battery cell to determine the wiring resistance for the individual battery cell. The voltage and current may correspond to a subset of individual cells less in number than a total number of cells in the traction battery, wherein the battery cell resistance corresponds to the subset of individual cells. The controller may be programmed to control charging of the traction battery based on the wiring resistance by adjusting subsequent voltage or current measurements, for example.

In various embodiments, the vehicle includes a controller programmed to calculate the wiring resistance based on the difference and a second difference between a total resistance indicated by a second voltage and current at a second temperature and a battery cell resistance associated with the second temperature and previously stored in the memory. The controller may be further programmed to measure a second voltage and second current at the first temperature and to calculate the total resistance based on a difference between the voltage and the second voltage divided by a difference between the current and the second current. The controller may be programmed to calculate the cell resistance at a second temperature based on the previously stored cell resistance for the first temperature as an exponential function of the first and second temperatures multiplied by the previously stored cell resistance.

Embodiments according to the present disclosure may provide one or more advantages. For example, adaptive online determination of wiring resistance may improve accuracy of individual battery cell voltage measurements and battery pack measurements used in controlling the battery and vehicle. Improved measurement accuracy may facilitate fast charging as well as improving battery capacity and SOC determinations.

The above advantages and other advantages and features associated with various embodiments will be readily apparent to those of ordinary skill in the art from the following detailed description of when taken in connection with the accompanying drawings.

DETAILED DESCRIPTION

Figure 1:
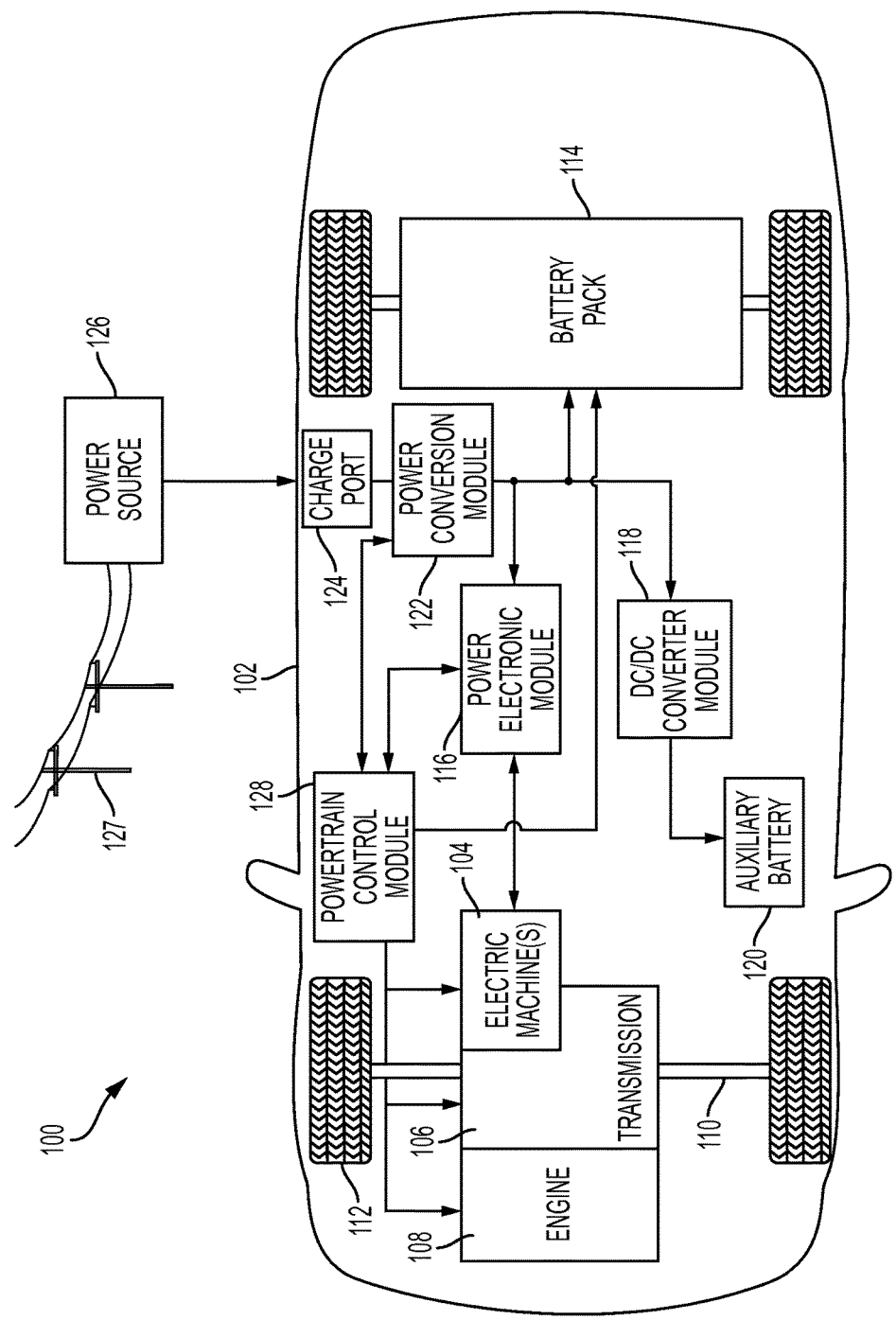
FIG. 1 is a representative vehicle that controls the vehicle and/or battery pack based on resistance associated with battery pack connectors.

As required, detailed embodiments are disclosed herein; however, it is to be understood that the disclosed embodiments are merely representative of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

Battery packs in electric vehicles (EV) usually include hundreds of battery cells. The battery cells have an internal impedance that includes an ohmic resistance and reactance associated with capacitive and inductive characteristics of the cells. Electrical connectors, such as wires, cables and bars, may be used to connect the cells for power output and charging input. These electrical connectors introduce additional ohmic resistance (or wiring resistance) to the battery pack. As passive devices, these connectors generally contribute a purely ohmic resistance and no reactance because they do not exhibit capacitive or inductive characteristics. As used throughout this disclosure, the wiring resistance refers to the resistance associated with the connectors, cables, wires, etc. that may be used to electrically connect the individual battery cells and related components of the battery pack to associated sensors and/or controllers. The wiring resistance may affect the accuracy of battery cell and pack voltage measurements obtained by associated sensors. Without adjustments or compensation, the voltage measurements from the sensors will generally be higher than the actual battery voltage if obtained during charging when current is flowing into the battery, and lower than the actual battery voltage if obtained during discharging when current is flowing out of the battery.

Inaccurate voltage measurements may adversely impact vehicle and battery control and performance in various aspects. For example, the power capability of the battery pack may be limited because the maximum power output of the battery pack is typically constrained by the power capability estimated by the battery management system (BMS) using the ohmic resistance of the battery estimated based on current and voltage measurements. In the presence of wiring resistance, the estimated battery ohmic resistance will be higher than the actual cell resistance, resulting in reduced power capability of the traction battery.

The charging performance of the battery pack may also be affected by inaccurate voltage measurements. Fast charging is a key enabling technology for promoting the popularity of electrified vehicles. Fast charging typically starts with high charging current until a certain voltage threshold is reached, followed by a reduced charging current. A high wiring resistance will elevate the voltage during charging such that the battery will reach the voltage limit of the charging protocol earlier and the charging current will be reduced sooner than needed. The lower average charging current results in a longer charging time, or result in less energy being stored for a designated charging time.

The present disclosure may adaptively identify wiring resistance associated with individual cells as well as wiring resistance associated with the entire battery pack of a vehicle traction battery. The wiring resistance may be used to improve control and performance of the vehicle and/or battery by improving the accuracy of voltage measurements. For example, the wiring resistance may be used by one or more control modules to adapt or adjust the voltage measurements as the battery ages to reduce or eliminate underestimation of battery power capability. The power capability can be more accurately calculated using the true cell resistance (excluding the wiring resistance), and the voltages can be adjusted to reflect the true voltage of the cells and the pack. Voltage measurement correction or compensation may be performed at the individual cell level and/or at the battery pack level as the battery cells, battery pack, and vehicle system may have different requirements associated with a respective voltage or power limit. Wiring resistance at the cell level can be identified and compensated for by using the measured cell voltage, and that of the battery pack can be identified and compensated for by using the measured pack voltage.

FIG. 1 depicts an example of an electrified vehicle, implemented by a plug-in hybrid electric vehicle in this representative embodiment. A plug-in hybrid-electric vehicle 102 may comprise one or more electric machines 104 mechanically connected to a hybrid transmission 106. The electric machines 104 may be capable of operating as a motor or a generator. The hybrid transmission 106 is mechanically connected to an engine 108. The hybrid transmission 106 is also mechanically connected to a drive shaft 110 that is mechanically connected to the wheels 112. The electric machines 104 can provide propulsion and deceleration capability when the engine 108 is turned on or off. The electric machines 104 may also reduce vehicle emissions by allowing the engine 108 to operate at more efficient speeds and allowing the vehicle 102 to be operated in electric mode with the engine 108 off under certain conditions.

A traction battery or battery pack 114 stores energy that can be used by the electric machines 104. A vehicle battery pack 114 typically provides a high voltage DC output. The battery pack 114 is electrically connected to one or more power electronics modules 116. One or more contactors (Not shown) may isolate the traction battery 114 from other components when opened and connect the traction battery 114 to other components when closed. The power electronics module 116 is also electrically connected to the electric machines 104 and provides the ability to bi-directionally transfer energy between the traction battery pack 114 and the electric machines 104. For example, a battery pack 114 may provide a DC voltage while the electric machines 104 may require a three-phase AC current to function. The power electronics module 116 may convert the DC voltage to a three-phase AC current for the electric motors 104, for example, by using an inverter module. In a regenerative mode, the power electronics module 116 will convert the three-phase AC current from the electric machines 104 acting as generators to a DC voltage for traction battery 114, also using an inverter module or other circuitry. The systems and methods described herein are equally applicable to a pure electric vehicle or any other device or vehicle using a battery pack. For an electric vehicle, the hybrid transmission 106 may be implemented by a gear box connected to electric machines 104 and the engine 108 may be omitted.

In addition to providing energy for propulsion, the battery pack 114 may provide energy for other vehicle electrical systems. Such a system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a vehicle, the low voltage systems may be electrically connected to an auxiliary battery 120 which may be implemented by a 12V, 24V, or 48V battery, for example.

The battery pack 114 may be recharged by an external power source 126. The external power source 126 may be connected to electric vehicle supply equipment (EVSE) that includes circuitry and controls to regulate and manage the transfer of energy between the power source 126 and the vehicle 102 to provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. The functions of the power conversion module 122 may reside in the external power source 126 or EVSE in some applications. The vehicle engine, transmission, electric machines, battery, power conversion, and power electronics may be controlled by a powertrain control module (PCM) 128.

While illustrated as a plug-in hybrid electric vehicle (PHEV) in FIG. 1, vehicle 102 generally represents any type of electrified vehicle such as a battery electric vehicle (BEV) or a traditional hybrid electric vehicle (HEV), for example. Similarly, the powertrain configuration or arrangement to transfer power between vehicle wheels 112 and electric machines 104, engine 108 (when provided), and transmission 106 may include a power-split configuration, a continuously variable transmission (CVT), a step-ratio transmission with or without a torque converter, or various parallel, series, or parallel/series powertrain arrangements.

Figure 2:
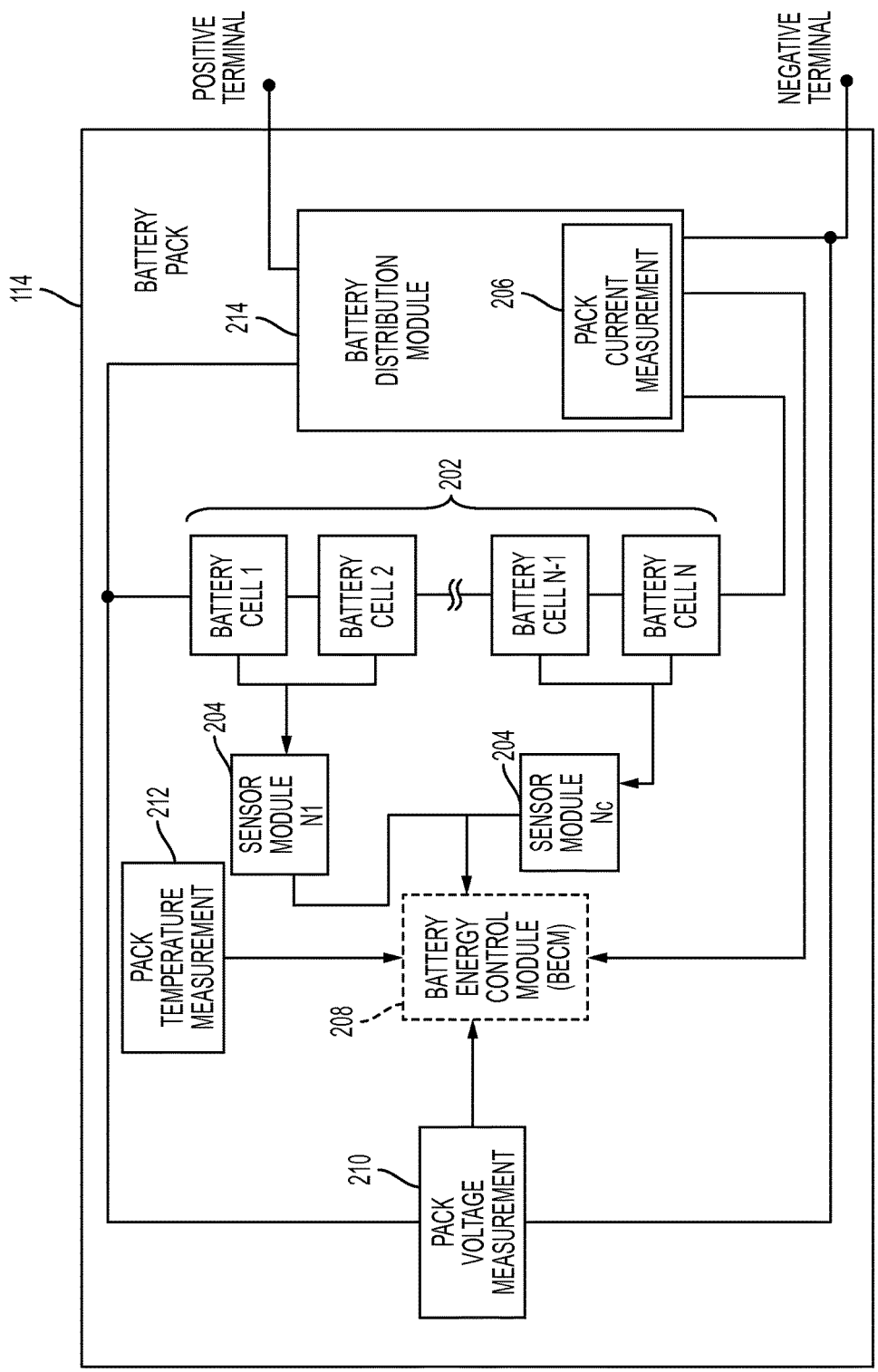
FIG. 2 illustrates a representative battery pack arrangement for measuring battery cell and battery pack voltages and currents for use in determining a benchmark resistance associated with battery pack connectors.

FIG. 2 illustrates a representative traction battery pack 114 having a series configuration of N battery cell modules 202. The battery cell modules 202 may contain a single battery cell or multiple battery cells electrically connected in parallel. The battery pack may be composed of any number of individual battery cells and battery cell modules connected in series or parallel or some combination thereof. Each sensor module 204 may be associated with one or more battery cell modules 202 or cells and may provide a corresponding cell voltage or cell module voltage for individual cells or groups or bricks of cells. Battery pack 114 includes various electrically conductive connectors to connect the battery cells and battery cell modules 202, sensor modules 204, sensors, controllers, and the like that may include wires, cables, bus bars, circuit interrupt devices, etc. that contribute to what is referred to as the battery pack wiring resistance in this disclosure.

Each of the battery cells or modules has an associated impedance that varies based on operating conditions. The impedance of the battery cells or cell modules may be modeled or estimated as an ohmic resistance associated with the purely resistive characteristics, and a reactance associated with the capacitive and inductive characteristics. The ohmic resistance of the battery cells or modules may be used to adaptively determine the wiring resistance associated with the electrically conductive connectors according to embodiments of the present disclosure as illustrated and described in greater detail with reference to FIGS. 3-6.

As shown in FIG. 2, battery pack 114 may include one or more controllers, such as a Battery Energy Control Module (BECM) 208 that monitors and controls the performance of the battery pack 114. The BECM 208 may be internally or externally located relative to battery pack 114. The BECM 208 may monitor several battery pack level characteristics such as pack current measured by a current sensor 206, pack voltage 210 and pack temperature 212. The pack voltage and current measurements may be used to adaptively determine the pack wiring resistance with the BECM 208 or another controller using the wiring resistance to adjust or compensate future measurements to improve accuracy. The pack voltage and current measurements may be used to estimate or calculate the battery state of charge and capacity.

In the event a battery cell is charging or discharging such that the current entering or exiting the battery cell exceeds a threshold, the BECM 208 may disconnect the battery cell by opening contacts or limiting current to the cell, for example. The battery cell may also be protected by the use of a circuit interrupt device (CID) such as a fuse or circuit breaker. The BECM 208 may include a memory that stores the internal resistance of a battery cell module 202. The battery cell resistance may be determined during testing and development of the battery cell. The battery cell resistance may vary over a range of temperatures and SOCs of the battery cell and battery pack. The BECM 208 may store the values of the battery cell resistances in one or more lookup tables based on the temperature, the SOC, or both. The stored values may be measured during battery manufacturing and assembly for each battery, or may represent a statistical value, such as an average, minimum, or maximum value, determined during program development and used for all batteries having similar specifications and applications.

In addition to the pack level characteristics, BECM 208 may measure, monitor, and/or control individual battery cells or groups of cells. For example, the terminal voltage, current, and temperature of each cell or a representative subset of cells may be measured. A system may use a sensor module 204 to measure the characteristics of one or more battery cell modules 202. In an example, the sensor module 204 may be part of the BECM 208. The characteristics may include battery cell voltage, temperature, age, number of charge/discharge cycles, etc. In an example, a sensor module will measure battery cell voltage. Battery cell voltage may be voltage of a single cell or of a group of cells. The measured battery cell voltage may be, at least in part, affected by the electrical connections connecting the cells to each other and to other components. The battery pack 114 may utilize up to $N_c$ sensor modules 204 to measure the characteristics of a representative sample or all of the battery cells 202. Each sensor module 204 may transfer the measurements in analog or digital form to the BECM 208 for processing and control. The battery pack 114 may also contain a battery distribution module (BDM) 214 which controls the flow of current into and out of the battery pack 114.

Figure 3:
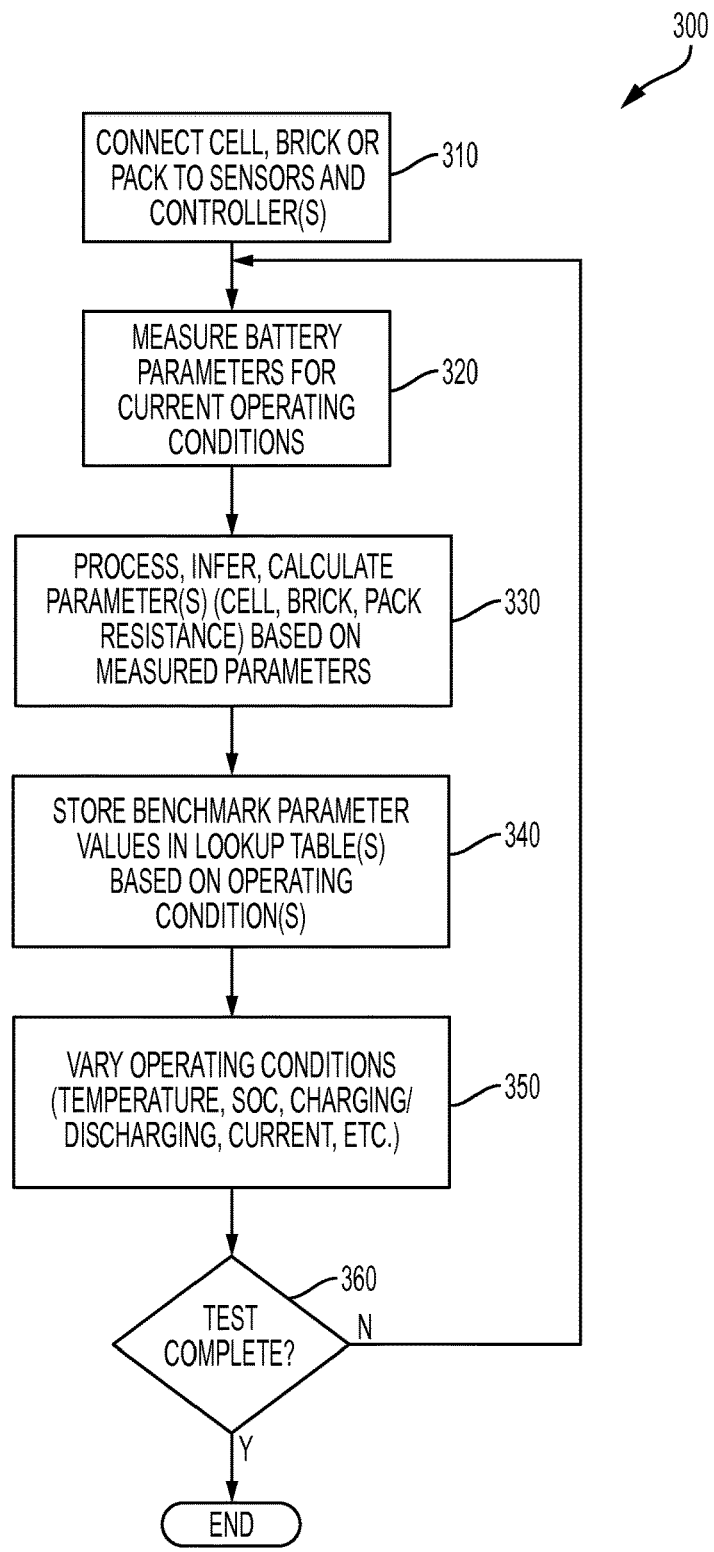
FIG. 3 illustrates empirical determination of battery resistance for subsequent use in onboard adaptive wiring resistance determination according to an example embodiment.
Figure 4:
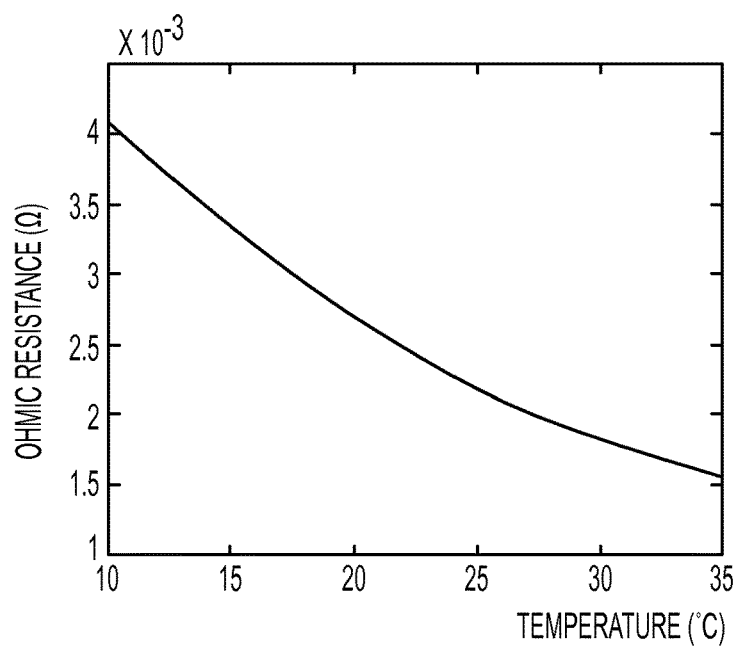
FIG. 4 is a graph illustrating battery ohmic resistance as a function of temperature for a representative battery state of charge based on data obtained from a single cell and adjusted for the total number of cells.

FIG. 3 is a graphical representation 300 of a testing procedure for empirical determination of battery cell resistance for subsequent use in onboard adaptive wiring resistance determination according to an example embodiment. An individual battery cell, group or brick of cells, and/or battery pack may be used to determine benchmark values for various parameters as operating conditions change. In one example, an individual lithium ion battery cell was used in laboratory testing at about 50% SOC to determine battery cell ohmic resistance as a function of temperature as illustrated in FIG. 4. The data from the single cell were used to estimate ohmic resistance for a battery pack based on the total number of cells in the battery pack as illustrated and described with reference to FIG. 5.

As shown in FIG. 3, an individual battery cell, group or brick of cells, and/or battery pack is connected to one or more sensors as represented at 310. The sensors may be similar to those used in vehicle applications, or may be used only in the testing/laboratory setting. Similarly, a battery controller may be used to determine the benchmark battery parameter values, or other testing computers or controllers may be used to measure or otherwise determine values for the desired parameters. Parameter values being measured or monitored may include voltage and current measurements for individual cells, bricks, and/or the entire battery pack, as well as battery or cell state of charge (SOC) and capacity, for example. Similarly, battery temperature may be monitored for one or more cells, or bricks, or for the entire battery pack.

As also shown in FIG. 3, parameter values for each of the monitored parameters are periodically measured or sampled as represented at 320 and may be processed to determine one or more other parameters as represented at 330. For example, impedance or ohmic resistance may be determined based on a battery cell or pack model using the measured currents and voltages and whether the battery is charging or discharging. The raw and/or processed benchmark parameter values are then stored in one or more lookup tables indexed by one or more operating conditions in a non-volatile storage medium or persistent memory as represented at 340. Parameter values may be stored for individual cells, bricks, and/or the entire battery pack. One or more operating conditions may be varied as represented at 350. Operating conditions may include ambient temperature, battery temperature, charging or discharging current, SOC, etc. The test may continue to modify operating parameters over several charging/discharging cycles and expected operating conditions to generate additional values for statistical analyses and/or to simulate battery aging as determined at 360. The process illustrated in FIG. 3 may be repeated for a number of cells or batteries to obtain data related to variations associated with manufacturing, assembly, and/or operation.

The representative process illustrated in FIG. 3 may be performed during vehicle or product development with the resulting parameter values stored in persistent memory associated with one or more vehicle or battery controllers for use in monitoring and controlling the vehicle. The process illustrated may be modified for use during manufacturing of a traction battery so that the values are unique to each battery pack prior to installation in a vehicle. Alternatively, parameter values determined during development may be used for all batteries of a similar type or application. The methods and vehicle systems described herein may determine the pack connector resistance, which may include the electrical connectors that connect the battery pack to other vehicle modules. The battery cell connector resistance may also be determined. The battery cell connector resistance is the resistance of the connectors that connect a cell to other cells and/or to the battery internal rails.

FIG. 4 is a graph illustrating battery ohmic resistance as a function of temperature for a representative battery state of charge based on data obtained from a single cell and adjusted for the total number of cells in a battery pack. The present disclosure recognizes that the wiring resistance associated with the wires, cables, connectors, etc. is generally constant across typical battery operating temperatures. In contrast, the resistance associated with the battery cells varies much more than the wiring resistance as a function of temperature. As shown in FIG. 4, a representative battery, such as the lithium ion battery used in some FORD FOCUS BEV models exhibits an ohmic resistance of the battery cells that varies as a function of temperature. The data illustrated in FIG. 4 was obtained with the battery at about 50% SOC. For this representative battery, the battery resistance decreases from a value of about 0.004 ohms to about 0.0015 ohms as the temperature changes from about 10° C. to 35° C. The data were obtained during laboratory testing of a single battery cell, where the wiring resistance is minimized and almost negligible. In the presence of wiring resistance, which does not change significantly with respect to temperature, the ohmic resistance values will increase by a generally constant value corresponding to the wiring resistance as illustrated in FIG. 5.

Figure 5:
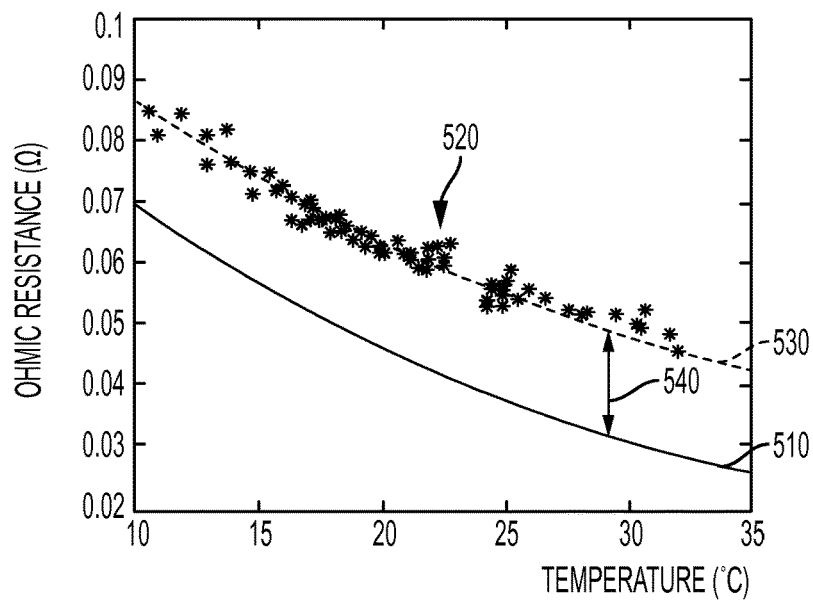
FIG. 5 is a graph illustrating resistance of a traction battery.

FIG. 5 is a graph 500 illustrating electrical connector or wiring resistance based on a difference between battery pack total resistance and a benchmark battery pack ohmic resistance as a function of temperature. Line 510 represents the benchmark battery ohmic resistance calculated by multiplying an empirically determined single cell resistance as previously described with reference to FIG. 4 by the number of cells in the battery pack. In this example, the values were obtained for a battery SOC of about 50%. Similar data may be obtained for other SOC values. The battery ohmic resistance values represented by line 510 may be stored in persistent memory associated with the BECM or another vehicle controller. Values may be stored in a lookup table indexed by battery temperature, and in some applications by SOC. Data values, generally indicated at 520, correspond to total pack resistance identified by an associated battery or vehicle controller during operation based on measured pack voltage and current for various battery temperatures as illustrated and described in greater detail with reference to FIG. 6. Line 530 is a curve fit to the data indicated at 520.

The present disclosure recognizes that the gap between the calculated pack resistance and the sum of cell resistances as indicated at 540 is generally constant across the illustrated temperature range and represents the wiring resistance. As illustrated by line 530, the total pack resistance decreases as the temperature increases due to the corresponding decrease of the ohmic resistance of the battery cells while the electrical connection or wiring resistance remains generally constant In this representative example, the wiring resistance is about 0.017 Ohm, accounting for 20% of the total pack resistance at 10° C., and 40% at 35° C., which is a significant amount that may impact battery pack voltage measurements and associated battery and vehicle control. As such, embodiments according to the present disclosure adaptively compensate for the wiring resistance to improve battery and/or vehicle control and performance.

Figure 6:
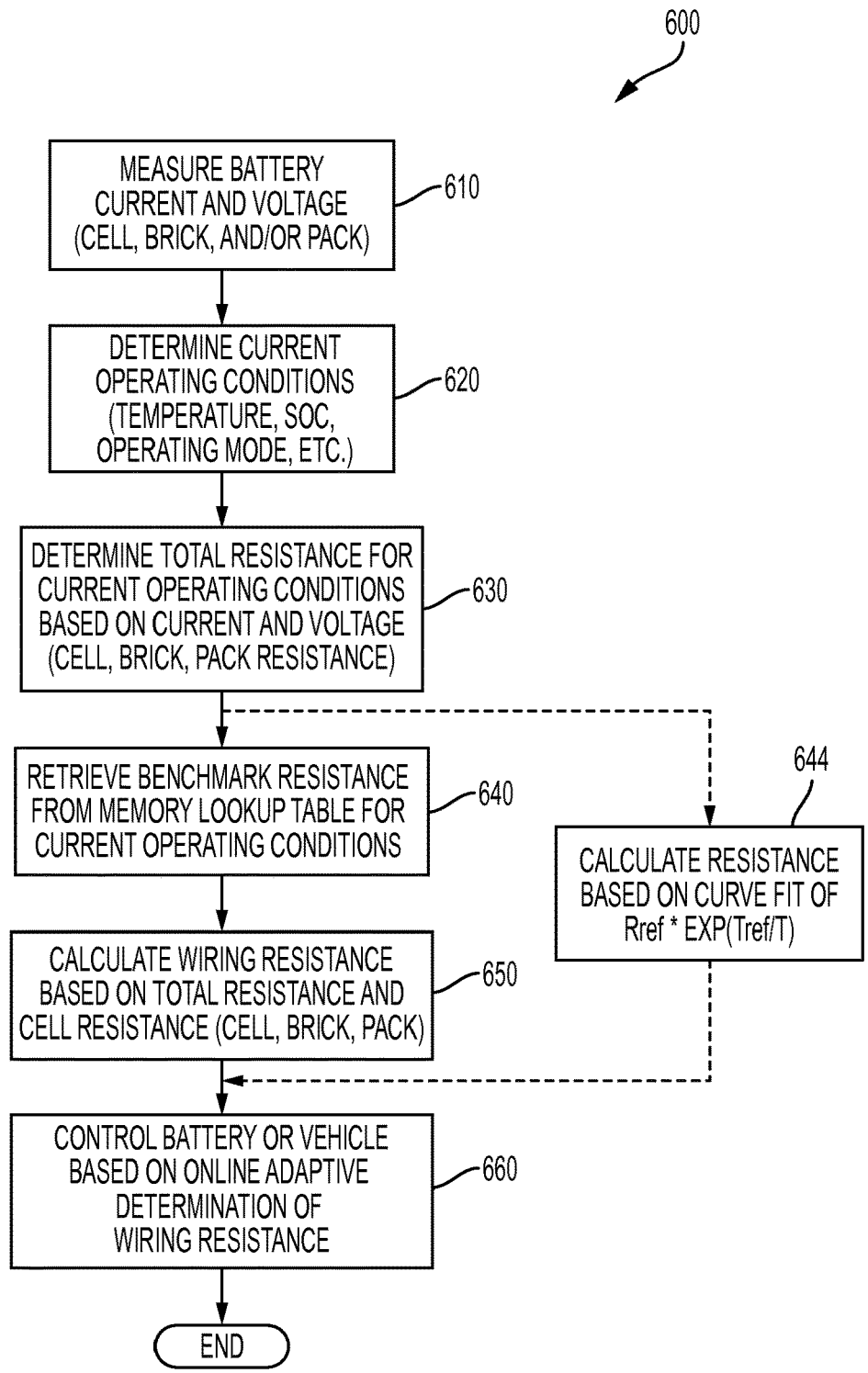
FIG. 6 is a flow chart illustrating operation of a system or method for vehicle or battery control based on vehicle online adaptive wiring resistance determinations according to an example embodiment.

FIG. 6 is a flow chart illustrating operation of a system or method for vehicle or battery control based on vehicle online adaptive wiring resistance determinations according to an example embodiment. Various system elements may be implemented as computer-readable instructions (e.g., software) executable by one or more controllers or processors, stored on associated non-transitory computer readable media (e.g., memory, disks, integrated circuits, etc.). A computer program product may comprise such instructions stored on computer readable media for carrying out the functions described herein. Some or all of the operations disclosed as being performed by the battery or vehicle controller may be based on instructions stored on such computer program products. Alternatively, the computer program products may be provided as hardware or firmware, or combinations of software, hardware and/or firmware.

With regard to the described processes, systems, methods, strategies, etc., it should be understood that, although the features, functions, processes, etc. may be described as occurring according to a certain ordered sequence, such features or processes could be performed in an order other than the order described or illustrated. Certain functions or features may be performed simultaneously or in parallel, and may be repeatedly performed whether or not explicitly described or illustrated as being repeated. One or more of the illustrated or described functions, features, or operations may be omitted in some applications and implementations.

In the system or method of operation 600 illustrated in FIG. 6, an adaptive battery wiring resistance associated with various electrical connections (e.g., wiring and connectors) for a traction battery pack. Battery current and voltage are measured by associated sensors as represented at 610. In one example, the BECM uses associated sensors to measure an open circuit voltage for at least one battery cell. As previously described, voltage and current may be measured for an individual cell, a group or brick of cells, and/or the entire battery pack. The controller may determine current operating conditions as represented at 620. Operating conditions may be determined by associated sensors, such as a temperature sensor, or may be determined by another controller or system and communicated over a vehicle network, for example. Operating conditions may also be calculated or inferred from one or more measured parameters or otherwise determined based on a battery or vehicle operating mode or state. Operating conditions may include ambient temperature, battery temperature, SOC, battery charging/discharging state, etc.

A total resistance value is determined for current operating conditions based on the measured current and voltage as represented at 630. The total resistance may be determined for an individual cell, a group or brick of cells, or the entire battery pack based on corresponding voltage and current measurements for the individual cell, group or brick or cells, or the entire battery pack, respectively.

The determination or identification of cell, brick, or pack resistance may be performed based on voltage and current measurement in various ways. For example, battery voltage may be modeled by an equivalent circuit represented in matrix notation as:

$$\begin{bmatrix} SOC_{k+1} \\ V_{c1,k+1} \\ \vdots \\ V_{cn,k+1} \end{bmatrix} = \begin{bmatrix} 0 & 0 & \cdots & \\ 0 & e^{\frac{-\Delta t}{R_{c1}C_{c1}}} & & \\ & \vdots & & \\ 0 & \cdots & & e^{\frac{-\Delta t}{R_{cn}C_{cn}}} \end{bmatrix} \begin{bmatrix} SOC_k \\ V_{c1,k} \\ \vdots \\ V_{cn,k} \end{bmatrix} + \begin{bmatrix} -\frac{1}{Q} \\ R_{c1}\left(1 - e^{\frac{-\Delta t}{R_{c1}C_{c1}}}\right) \\ \vdots \\ R_{cn}\left(1 - e^{\frac{-\Delta t}{R_{cn}C_{cn}}}\right) \end{bmatrix} I_k$$

$$V_k = g(SOC_k) + \sum_{j=1}^{n} V_{cj} + I_k(R + R_{wire}),$$

where $I_k$ is the current input, $\Delta t$ is the sampling period, Q is the battery capacity, R is the battery ohmic resistance, $R_{wire}$ is the wiring resistance, and $R_{cj}$ and $C_{cj}$ are the equivalent R-C pairs used to capture the transient voltage dynamics $V_{cj}$.

As another example, in the presence of a sudden change in current, change in voltage will mainly be caused by the ohmic resistance, which can be estimated as:

$$R + R_{wire} = \frac{\Delta V}{\Delta I} = \frac{V_{k+1} - V_k}{I_{k+1} - I_k},$$

for $\Delta I$ being large enough. Other methods that may be used to determine the resistance include but are not limited to a least squares algorithm or Kalman filtering, among others. The resistance identified here is the total resistance, including both the cell resistance and the wiring resistance.

With continuing reference to FIG. 6, a benchmark resistance is retrieved from a memory lookup table for the current operating conditions as represented at 640. Benchmark battery resistance values may be determined for individual batteries or for a group or class of batteries and stored in memory as previously described with reference to FIG. 3, for example. Likewise, benchmark values may represent cell, brick, or pack values that may be stored in separate lookup tables or may be calculated or derived from one or more stored values. For example, a brick or pack resistance value may be obtained by retrieving a cell resistance value and multiplying by the number of cells in the brick or pack, for example.

The wiring resistance for the cell, brick, or pack is determined based on a difference between the corresponding total resistance and the battery resistance for the current operating conditions as represented at 650. Alternatively, or in combination, the resistance may be calculated as represented at 644. After the total resistance $R_{tot}$ is identified at 630, the wiring resistance $R_{wire}$ can be expressed as:

$$R_{wire} = R_{tot} - R(T),$$

where the battery resistance R(T) can be looked up based on the stored benchmark values as previously described. However, if the resistance value R changes over time due to battery aging or other degradation, for example, the following alternative method may be used to determine both the battery (cell, brick, or pack) resistance R and wiring resistance $R_{wire}$ from the corresponding total resistance $R_{tot}$ based on the corresponding voltage and current measurements. The relationship between battery resistance R and temperature T may be represented by:

$$R(T) = R_{ref} \exp\left(\frac{T_{ref}}{T}\right),$$

where $R_{ref}$ and $T_{ref}$ are parameters to be determined. Hence $R_{tot}$ is given by $$R_{tot}(T) = R_{wire} + R(T) = R_{wire} + R_{ref}\exp\left(\frac{T_{ref}}{T}\right).$$

After obtaining $R_{tot}$ at different temperatures T, $R_{wire}$, $R_{ref}$ and $T_{ref}$ can be determined from a curve fit for the $R_{tot}$-T curve.

As represented at 660, the online adaptive determination of the wiring resistance may be used to control the battery or vehicle. For example, the wiring resistance may be used to adjust or offset subsequent voltage measurements for cell voltage, brick voltage, or pack voltage. More accurate determination of these values may be used to determine other battery or vehicle parameters, such as SOC and battery capacity, for example. Battery or vehicle control may include control of battery charging and discharging, operating in an electric mode, control of battery current limits, etc.

As such, embodiments according to the present disclosure may provide one or more advantages associated with online adaptive wiring resistance determination. For example, wiring resistance may be used to improve accuracy of individual battery cell voltage measurements and battery pack measurements used in controlling the battery and vehicle. Improved measurement accuracy may facilitate fast charging as well as improving battery capacity and SOC determinations.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle comprising:
   a traction battery; and
   a controller coupled to the traction battery and having a memory, the controller programmed to control the traction battery based on a difference between a total resistance of the traction battery indicated by voltage and current at a first temperature and a battery cell resistance associated with the first temperature and previously stored in the memory, the difference being indicative of a traction-battery wiring resistance.

2. The vehicle of claim 1, the battery cell resistance corresponding to a single cell resistance multiplied by a number of cells in the traction battery, the single cell resistance based on measured cell current and voltage for a plurality of temperatures across a temperature operating range.

3. The vehicle of claim 1, the controller programmed to obtain the voltage and current for an individual battery cell to determine the wiring resistance for the individual battery cell.

4. The vehicle of claim 1, the voltage and current corresponding to a subset of individual cells less in number than a total number of cells in the traction battery, wherein the battery cell resistance corresponds to the subset of individual cells.

5. The vehicle of claim 1, the controller programmed to control charging of the traction battery based on the wiring resistance.

6. The vehicle of claim 1, the controller programmed to adjust subsequent voltage or current measurements based on the wiring resistance.

7. The vehicle of claim 1, the controller further programmed to calculate the wiring resistance based on the difference and a second difference between a total resistance indicated by a second voltage and current at a second temperature and a battery cell resistance associated with the second temperature and previously stored in the memory.

8. The vehicle of claim 1, the controller further programmed to measure a second voltage and second current at the first temperature and to calculate the total resistance based on a difference between the voltage and the second voltage divided by a difference between the current and the second current.

9. The vehicle of claim 1, the controller further programmed to calculate the cell resistance at a second temperature based on the previously stored cell resistance for the first temperature.

10. The vehicle of claim 9, wherein the controller calculates the cell resistance as an exponential function of the first and second temperatures multiplied by the previously stored cell resistance.

11. A vehicle method, comprising:
    controlling a traction battery or the vehicle based on wiring resistance associated with battery electrical connections associated with a difference between total resistance calculated using battery pack voltage and pack current measured during operation at a first operating condition and a previously stored battery pack cell resistance for the first operating condition, the pack cell resistance based on a single cell resistance multiplied by a number of cells in the pack.

12. The method of claim 11, the first operating condition comprising battery temperature.

13. The method of claim 11, the first operating condition comprising battery state of charge.

14. The method of claim 11, the battery voltage and current corresponding to a battery cell voltage and battery cell current and the stored battery cell resistance corresponding to a single battery cell.

15. The method of claim 11, the voltage and current of the traction battery corresponding to a pack voltage and pack current and the stored battery cell resistance corresponding to pack cell resistance.

16. The method of claim 15, the pack cell resistance based on a single cell resistance multiplied by a number of cells in the pack.

17. The method of claim 11 wherein controlling the traction battery comprises adjusting a battery voltage based on the wiring resistance.

18. The method of claim 11 wherein controlling the traction battery or the vehicle comprises adjusting a battery capacity based on the wiring resistance.

19. A non-transitory computer readable storage medium having stored instructions executable by a vehicle processor associated with a traction battery comprising instructions for:
    retrieving a battery cell resistance from memory based on a current operating condition; and
    controlling charging or discharging of the traction battery in response to internal resistance based on a difference between a traction battery total resistance, associated with a battery voltage and current measurement at the current operating condition, and the battery cell resistance while correcting for a traction-battery wiring resistance.

20. The computer readable storage medium of claim 19, the battery cell resistance corresponding to a single battery cell of the traction battery at a select operating condition of a vehicle, the battery voltage and current measurement corresponding to a pack voltage and pack current.

* * * * *